Figure 1:
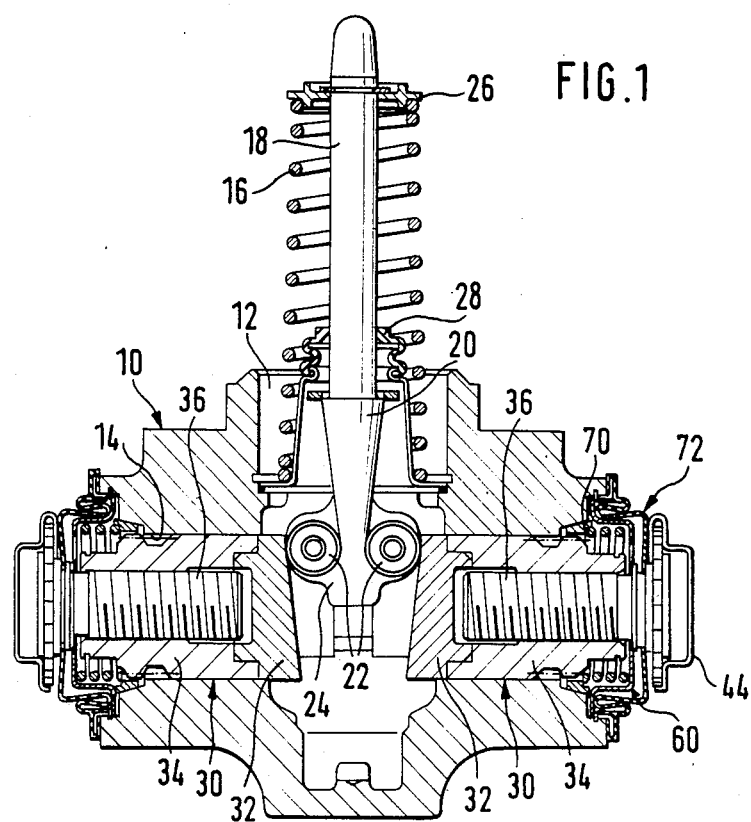

United States Patent [19]

Gockel et al.

[11] Patent Number: 4,688,661
[45] Date of Patent: Aug. 25, 1987

[54] ADJUSTABLE BRAKE ACTUATOR, ESPECIALLY FOR VEHICLE DRUM BRAKES

[75] Inventors: Harald Gockel; Reiner Thewalt, both of Bendorf; Wilfried Giering, Mendig, all of Fed. Rep. of Germany

[73] Assignee: Lucas Industries Public Limited Company, Birmingham, England

[21] Appl. No.: 796,234

[22] Filed: Nov. 8, 1985

[30] Foreign Application Priority Data

Nov. 8, 1984 [DE] Fed. Rep. of Germany ... 8432744[U]

[51] Int. Cl.[4] .............................................. F16D 65/56
[52] U.S. Cl. .................................. 188/196 D; 74/18.2; 92/130 C; 92/168; 188/79.5 GE; 192/111 A
[58] Field of Search ............... 188/79.5 GE, 196 D, 188/71.9, 202; 192/111 A; 92/130 C, 168 B; 74/18.2

[56] References Cited

U.S. PATENT DOCUMENTS

| 2,100,488 | 11/1937 | Rasmussen | 188/795 GE |
|---|---|---|---|
| 3,068,964 | 12/1962 | Williams et al. | 188/196 D X |
| 3,361,232 | 1/1968 | Engle | 188/79.5 GE |
| 3,540,554 | 11/1970 | Burnett et al. | 188/79.5 GE |
| 3,783,981 | 1/1974 | Burgdorf | 188/71.9 X |
| 3,800,920 | 4/1974 | Warwick | 188/71.9 X |
| 4,036,332 | 7/1977 | Sander | 188/196 D |
| 4,270,442 | 6/1981 | Bainard et al. | 74/18.2 X |
| 4,327,925 | 5/1982 | Alexander et al. | 74/18.2 X |
| 4,399,894 | 8/1983 | Tribe | 188/196 D X |
| 4,535,875 | 8/1985 | Ingram et al. | 188/196 D X |

FOREIGN PATENT DOCUMENTS 2080894 2/1982 United Kingdom ....... 188/79.5 GE

Primary Examiner—George E. A. Halvosa
Attorney, Agent, or Firm—Scrivener and Clarke

[57] ABSTRACT

A casing (10) has a bore (14) and a clutch face (48) concentric with the bore. In the bore (14) a tappet (30) of variable length is slidably guided and includes two threaded members (34,36) interconnected by a self-locking screw thread pair (38). A clutch member (50) connected to one of the two threaded members (34) by a non-self-locking screw thread pair (52) is associated with the clutch face (48). A support member (60) having an aperture (68) through which the other one of the two threaded members (36) extends is fixed to the casing (10). A clutch spring (70) is inserted between the support member (60) and the clutch member (50) and urges the clutch member (50) into abutment against the clutch face (48). A sealing boot (72) which is disposed outside of the support member (60) with respect to the casing (10) provides an external seal for the screw thread pairs (38,52) and the clutch member (50). The support member (60) and the sealing boot (72) are separately fixed to the casing (10).

6 Claims, 4 Drawing Figures

ADJUSTABLE BRAKE ACTUATOR, ESPECIALLY FOR VEHICLE DRUM BRAKES

The invention relates to an adjustable brake actuator, especially for vehicle drum brakes, comprising a casing which has a bore and a clutch face concentric with said bore, at least one tappet of variable length guided to slide in the bore and including two threaded members which are interconnected by a self-locking screw thread pair, a clutch member associated with the clutch face of the casing and connected to one of the two threaded members by a non-selflocking screw thread pair, a support member fixed to the casing and having an aperture through which extends at least the other one of the two threaded members, a clutch spring inserted between the support member and the clutch member and urging the latter into abutment against the clutch face, and a sealing boot disposed outside of the support member with respect to the casing and providing an external seal for the screw thread pairs and the clutch member.

In known actuating devices of this kind (GB-A-No. 14 12 151 and GB-A-No. 20 80 894) the support member is cup shaped and slipped on a cylindrical outside surface of the casing, being fastened on the same either by friction lock or by crimping. The sealing boot is fixed by its one end to the outside of the cup-shaped support member, while its other end is fastened to the threaded member projecting outwardly through the aperture in the support member.

A tight connection between the sealing boot and the support member may be achieved with these known actuators by vulcanizing. However, that has the disadvantage that a sealing boot once it has become brittle for instance by the influence of heat, cannot be replaced without the support member. And as soon as the support member has been removed, there is no retention for the clutch spring and clutch member so that they may fall out and possibly get lost or be rearranged erroneously upon being reinserted. On the other hand, if the sealing boot is not attached to the support member by vulcanizing, there is the risk of the connection between them becoming leaky as the support member gets deformed, for example, by careless manipulation on assembly or by being hit by stones in operation. Regardless of the above, there is the risk that sludge, salty water or other abrasive and/or corrosive substances enter where the support member is fixed to the casing since a permanent seal at this location of atttachment hardly can be guaranteed.

For these reasons the reliability of the adjustment of known actuators of the generic kind in question still is wanting under difficult operating conditions. The adjustments which are required to compensate the wear of the friction linings may be left undone because of contamination or corrosion within the actuator or they may be made belatedly after numerous actuations of the brakes. Then it may become necessary to carry out a premature exchange of the entire actuator or of essential parts thereof.

It is, therefore, an object of the invention to develop an actuator of the kind recited initially such that its proper functioning is maintained as long as possible even under the most severe operating conditions and that the maintenance of the actuator is facilitated.

The object is met, in accordance with the invention, in that the support member and the sealing boot are separately fixed to the casing.

In this manner the sealing boot becomes removable with ease without having to detach the support member as well, and the risk of inadvertently disassembling the support member is minimized, perhaps excluded by the separate attachment to the casing. Upon removal of the sealing boot the otherwise fully mounted actuator according to the invention may be filled with grease without running the risk that the clutch spring comes out and then also the clutch member falls out.

With an especially convenient embodiment of the invention the sealing boot comprises a stiff retainer ring of L-shaped cross section which is press fitted on an outer surface of the casing, keeping an annular elastic rim of the sealing boot clamped between itself and an end surface of the casing. The reliability of the press fit is totally independent of the bias of the coupling spring. Consequently, a light press fit may be chosen for fixing the sealing boot even if the coupling spring is inserted under great bias. The fastening and sealing functions of the stiff retainer ring are completely separate, both being independent of the type of fastening of the support member and the loading which this fastening has to withstand, for instance as a result of mass moments of inertia which may occur in operation.

The preferred embodiment of the invention described above conveniently is developed further in that the outer surface is formed by an enlargement of the bore in the casing. This means that the retainer ring of L-shaped cross section engages in the enlargement of the bore and that the support member is protected by the same, being arranged more or less on the inside thereof.

With this arrangement it is furthermore advantageous for the enlargement to have a shoulder behind which the support member is releasably held. There are numerous per se known variations of this releasable retention, such as the bayonet catch design. The shoulder may be formed by a locking ring which is elastically snapped into an annular groove formed in the enlargement of the bore. Preferably, however, the support member comprises a slotted flange which is snapped directly into an annular groove formed in the enlargement of the bore.

Figure 2:
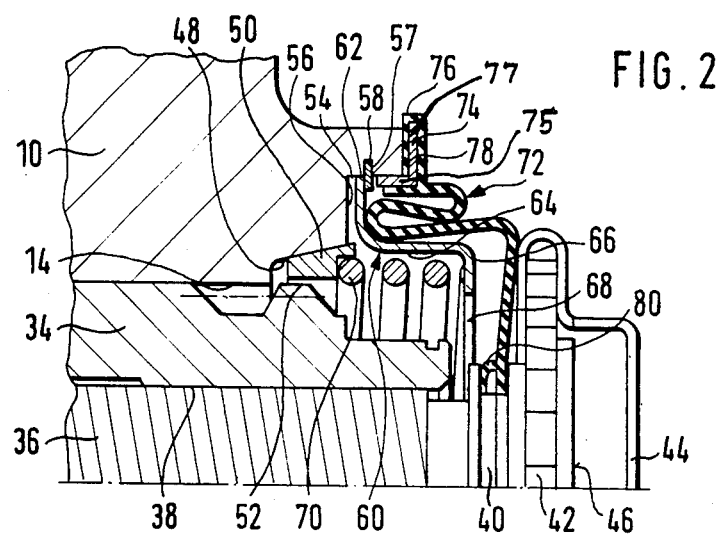
Figure 3:
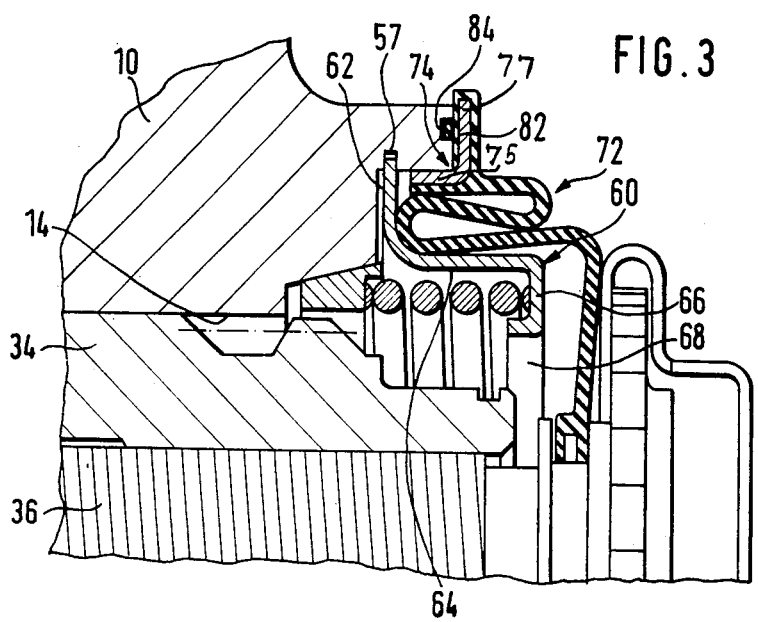
Figure 4:
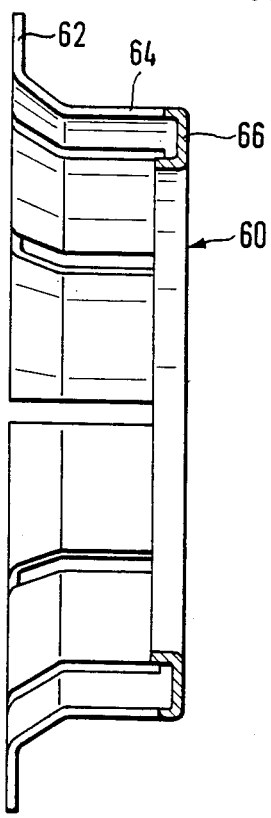

The invention will be described further, by way of example, with reference to the accompanying drawings, in which:

FIG. 1 is an axial sectional view of an adjustable brake actuator of drum-type brakes with internal brake shoes for commercial vehicles, FIG. 2 is an enlarged cut-out of FIG. 1, FIG. 3 shows a preferred modification of FIG. 2, and FIG. 4 shows a detail of FIG. 3.

The actuator shown comprises a casing 10 of conventional, approximately T-shaped design and destined to be secured to the brake plate of substantially circular ring shape of a drum brake. The casing 10 has a central recess 12 and a transversely directed, substantially cylindrical bore 14. The recess 12 passes through the bore 14 which thus is divided into two sections of equal size. The actuator is generally symmetrical with respect to the central plane of the recess 12 which plane is normal to the plane of FIG. 1 of the drawing.

One end of a helical compression spring 16 is attached to the casing 10 within the recess 12. A rod 18 extends axially through the compression spring 16 and has one end, the one remote from the casing 10, designed for cooperation with a power output device, such as a pneumatic piston and cylinder unit. The other end of the rod 18 arranged in the central recess 12 is designed as an expanding cone 20 and engages between two rollers 22 which are supported in a cage 24. The cage 24 is displaceable with respect to the casing 10 and the rod 18 in the longitudinal direction of the latter. The end of the rod 18 remote from the casing 10 is centered by an annular disc 26 with respect to the corresponding end of the compression spring 16. A sleeve 28 is positioned on the rod 18 in an area closer to the casing 10 to provide a seal with respect to the casing 10 or a structural member tightly connected with the same.

Each of the two sections of transversely disposed bore 14 divided by the central recess 12 houses a respective tappet 30 which substantially consists of a hardened end member 32, a sleeve-like threaded member 34, and a bolt-like threaded member 36. The end member 32 of each of the two tappets 30 is secured against rotation and constitutes a wedge-shaped race for the adjacent roller 22. The sleeve-like threaded member 34 is guided for rotation and axial displacement within the respective section of the transversely disposed bore 14 and is connected to the corresponding bolt-like threaded member 36 by a self-locking screw thread pair 38.

At an end portion protruding from the sleeve-like threaded member 34 and the casing 10 the bolt-like threaded member 36 is formed with an annular groove 40 and outside thereof with a external toothing 42 cooperating with an resilient clip 44 as a securing means against rotation, and finally with a planar end surface 46 designed for cooperation with one end of an associated brake shoe.

A conical inner clutch face 48 is formed around each of the two sections of the tranversely disposed bore 14 and coaxial with the latter, and a complementary annular clutch member 50 is coordinated with the clutch face. The clutch member 50 is positioned between the coupling face 48 and the corresponding sleeve-like threaded member 34 together with which it forms a non-self-locking screw thread pair 52 having an axial clearance which determines the magnitude of the running clearance of the corresponding brake.

The conical inner clutch face 48 of each of the two sections of the transversely disposed bore 14 is followed in outward direction with respect to the casing 10 by a cylindrical enlargement 54 which begins with a planar annular shoulder 56 and has an annular groove at a distance a little further out into which groove an elastic locking ring 58 is introduced. A top hat-shaped support member 60 having an integral outer radial flange 62 is held between the shoulder 56 and the locking ring 58. Next to the outer flange 62 the support member 60 has a cylindrical central portion 64 which is followed axially further outwardly by a flange 66 which extends radially inwardly and defines a central aperture 68.

A clutch spring 70 embodied by a helical compression spring is mounted under bias between the flange 66 and the annular clutch member 50 so that normally the clutch member 50 abuts against the conical inner clutch face 48 under a pressure which is sufficient to prevent any rotation of the clutch member 50.

A sealing boot 72 is arranged axially outside of the support member 60. It consists substantially of rubber or a rubberlike plastic material and comprises a stiff retainer ring 74 of sheet metal at its one end. The retainer ring 74 is L-shaped in cross section, one leg 75 of which defines a substantially cylindrical collar and the other leg 77 a substantially planar flange directed radially outwardly. The collar of the retainer ring 74 is press fitted into a peripheral surface of the casing such as the cylindrical enlargement 54, thus being attached firmly to the casing 10 but removable for exchange of the sealing boot 72.

The rubber or other elastomeric material of the sealing boot 72 covers the retainer ring 74 at the radially inner side of the cylindrical collar thereof and at the axially outer side of the flange thereof, extends around the radially outer edge thereof, and forms an elastic rim 76 at the axially inner side of this flange facing the casing 10, the rim 76 effecting sealing as against a planar end surface 78 of the casing 10. At its other end the sealing boot 72 is formed with a marginal bead 80 which engages in the annular groove 40 of the bolt-like threaded member 36 and likewise establishes a seal at that location.

In the preferred embodiment shown in FIGS. 3 and 4 the top-hat like support member 60 is slotted at its radially outer flange 62 and shell portion 64 whereby it is elastically compressible. The locking ring 58 is left out, and the flange 62 itself is snapped into the annular groove 57.

In contradistinction to FIG. 2 FIG. 3 further shows an annular seal 82 which is vulcanized to the radially inner side of the planar flange formed at the retainer ring 74 and engages in an annular groove 84 formed in the end surface 78 of the casing 10.

The mode of operation of the actuator shown and described above as well as its automatic adjustment are known (cf. for instance page 3, lines 8-42 of GB-A14 12 151 mentioned above).

What is claimed is:

1. An adjustable brake actuator, especially for vehicle drum brakes, comprising a casing (10) which has a bore (14) and a clutch face (48) concentric with said bore, at least one outwardly extending tappet (30) of variable length guided to slide in the bore (14) and including two outwardly extending threaded members (34,36) which are interconnected by a self-locking screw thread pair (38), a clutch member (50) associated with the clutch face (48) of the casing (10) and connected to one of the two threaded members (34) by a non-self-locking screw thread pair (52), a support member (60) fixed to the casing (10) and having an aperture (68) in a portion (64) thereof extending axially outwardly of said casing (60) and through which extends at least the other one of the two threaded members (36), a clutch spring (70) inserted between the support member (60) and the clutch member (50) and urging the latter into abutment against the clutch face (48), a sealing boot (72) separate from and free of the support member (60) and disposed outwardly of the support member (60) with respect to the casing (10), said sealing boot (72) having a first part comprising an annular elastic rim (76) for sealingly engaging said casing (10) and a second part (80) for sealingly engaging said other one (36) of the two threaded members (34,36) whereby said boot (72) provides an external seal for the screw thread pairs (38,52) and the clutch member (50), and a retainer which cooperates with said boot rim (76) comprising a stiff retainer ring (74) of L-shaped cross section and having one leg (75) press fitted into direct engagement with a peripheral surface of the casing (10), and the other leg (77) clamping said annular elastic rim (76) of the sealing boot (72) between itself and an outer end surface (78) of the casing (10), whereby said sealing boot may be removed from said casing without detaching said support member.

2. The actuator as claimed in claim 1, characterized in that said pheripheral surface is formed by an enlargement (54) of the bore (14) of the casing (10).

3. The actuator as claimed in claim 2, characterized in that the enlargement (54) of the bore (14) includes a shoulder behind which the support member (60) is releasably held.

4. The actuator as claimed in claim 3, characterized in that the shoulder is formed by a locking ring (58) which is elastically snapped into an annular groove (57) formed in the enlargement (54) of the bore (14).

5. The actuator as claimed in claim 2, characterized in that the support member (60) includes a slotted flange (62) which is snapped directly into an annular groove (57) formed in the enlargement (54) of the bore (14).

6. The acutator as claimed in claim 1 wherein said peripheral surface is cylindrical.

* * * * *